Feb. 5, 1957 C. LYNN ET AL 2,780,741
DIRECT CURRENT DYNAMOELECTRIC MACHINE
Filed April 19, 1954

WITNESSES
Edwin E. Bassler
Leon M. Garman

INVENTORS
Clarence Lynn &
John V. Dobson
BY 7. P. Lyle
ATTORNEY

United States Patent Office 2,780,741
Patented Feb. 5, 1957

2,780,741

DIRECT CURRENT DYNAMOELECTRIC MACHINE

Clarence Lynn, Buffalo, N. Y., and John V. Dobson, Pittsburgh, Pa.; said Lynn assignor to Westinghouse Electric Corporation, East Pittsburgh, Pa., a corporation of Pennsylvania, and said Dobson assignor to Stackpole Carbon Company, St. Marys, Pa.

Application April 19, 1954, Serial No. 423,987

6 Claims. (Cl. 310—177)

The present invention relates to direct current dynamoelectric machines and, more particularly, to a new type of direct current machine having relatively high current capacity.

Conventional direct current dynamoelectric machines have a plurality of armature coils connected together and to a commutator, with brushes engaging the commutator and making contact with the commutator bars connected to armature coils which are passing through the neutral zone, that is, the region between adjacent poles of opposite polarity where the field strength is close to zero. In this type of machine, there is usually a plurality of armature coils in series between the brushes, so that the voltage of the machine is equal to the sum of the voltages generated in a plurality of coils. The coils which are undergoing commutation as they pass through the neutral zone are short-circuited by the brushes, and the brushes, therefore, have to carry the commutation current of the short-circuited coils in addition to the normal load current, thus reducing the maximum permissible load current. The brushes can extend circumferentially over only a small segment of the commutator surface, and since the current capacity of the machine is limited by the current which can be carried by the brushes, the brush area is frequently a limiting factor in the rating of the machine, and in order to obtain adequate current capacity, it is often necessary to make the brushes relatively long in the axial direction, resulting in an undesirably long commutator.

Unipolar or homopolar direct current machines are also known. These machines have no commutator and the voltage is generated in single conductors connected to slip rings. This type of machine is not subject to the current limitations of the commutator-type machine and can be designed for relatively large currents. Since the voltage is essentially that which can be generated in a single conductor, however, only very low voltages can be obtained and this type of machine has very limited practical application.

The principal object of the present invention is to provide a direct current dynamoelectric machine which avoids the disadvantages of the known types of machines.

Another object of the invention is to provide a direct current dynamoelectric machine which has a commutator but in which there is no commutation in the usual sense, that is, the armature coils are not short-circuited by the brushes, so that the brushes are not required to carry any commutation current, and in which the brushes are of sufficient circumferential extent to have high current capacity with relatively small axial length.

A more specific object of the invention is to provide a direct current machine in which the armature coils are individually connected to commutator bars, and in which the brushes engage a relatively large area of the commutator and make contact simultaneously with all the commutator bars connected to coils in which the generated voltage is substantially equal, at any instant, connecting these coils in parallel and obtaining high current output.

Other objects and advantages of the invention will be apparent from the following detailed description, taken in connection with the accompanying drawing, in which.

The physical construction of the new machine may be similar to that of the conventional commutator-type direct current machine, and any usual type of construction may be used. The essential features of the invention are shown diagrammatically in Fig. 1 embodied in a two-pole machine, although it will be obvious that the invention is applicable to machines having any number of pairs of poles.

Figure 1:
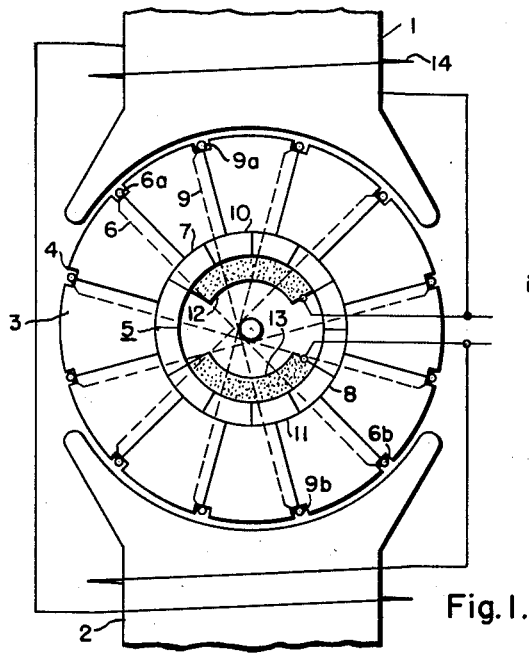
Figure 1 is a somewhat diagrammatic view of a direct current machine embodying the invention.

As shown diagrammatically in Fig. 1, the machine has pole members 1 and 2, which may be supported on a suitable frame structure and excited in any desired manner to provide a magnetic field. The machine also has an armature member 3 which may be generally similar to the armature of a conventional machine and which has a core provided with a plurality of peripheral slots 4. The armature also has a commutator 5 of any suitable construction. The number of commutator bars is shown as being equal to the number of slots, but the number of bars may be a multiple of the number of slots, if desired.

The armature winding consists of a plurality of independent coils disposed in the slots 4, twelve slots being shown for the purpose of illustration. Each of the coils is separately wound and insulated, and is not connected to any of the other coils. Thus, the coil 6 has a coil side 6a lying in one of the slots 4, and the other coil side 6b is disposed in the diametrically opposite slot of the armature core. The coil side 6a is connected to a commutator bar 7, and the coil side 6b is connected to a diametrically opposite commutator bar 8, the other ends of the coil sides 6a and 6b being connected together. Similarly, the next coil 9 has its coil sides 9a and 9b disposed in diametrically opposite slots, adjacent to those occupied by the coil 6, and the coil sides 9a and 9b are independently connected to diametrically opposite commutator bars 10 and 11, respectively. The remaining coils are arranged and connected in the same manner, each coil having its sides disposed in diametrically opposite slots and being independently connected to correspondingly located commutator bars. If desired, two or more coil sides might be placed in each slot and connected to adjacent commutator bars, the number of bars then being a multiple of the number of slots.

The machine is provided with stationary conducting brushes 12 and 13 which engage the surface of the commutator. The brushes are preferably made of carbon, or carbonaceous material and may be sectionalized, if desired. The brushes 12 and 13 are made very wide in angular extent, as compared with the brushes of a conventional machine, and they are positioned so that they make simultaneous contact with the commutator bars connected to coils which lie under the pole members 1 and 2 in the region of greatest field strength, at any instant, as clearly shown in Fig. 1. Thus, in contrast to the conventional type of machine in which the brushes are located in the neutral zone, the brushes of the new machine engage the commutator in position to make contact with the armature coils which lie under the poles, and the brushes are made of sufficient angular extent to make simultaneous contact to all, or any desired number, of these coils. The brushes are connected to the external load circuit, and a shunt field winding 14 may be connected across the brushes.

Figure 2:
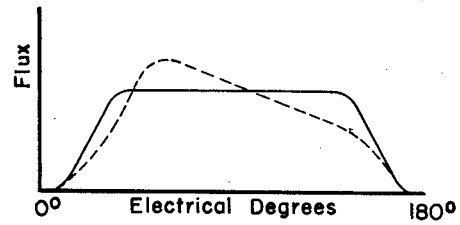
Fig. 2 is a diagram illustrating the magnetic field form.

The operation of this machine as a generator may be described as follows. Referring to Fig. 2, the solid line shows the magnitude of the field flux under one pole, plotted against the angular extent in electrical degrees, and it will be seen that the flux is substantially uniform over most of the extent of the pole. All the armature coils which are passing through this region of substantially constant field strength, therefore, will have substantially the same generated voltage. All of these coils are connected to the brushes simultaneously, since the angular extent of each brush on the commutator surface is made substantially the same as the angular extent of the uniform portion of the field under each pole. Thus, all the coils in which the generated voltage is substantially the same, at any instant, are connected in parallel to the external circuit, giving the machine high current capacity.

As each coil moves from the neutral zone, or region between the poles, into a region of increasing field strength as it approaches the next pole, its generated voltage will start to build up, in the manner shown by the solid line of Fig. 2, until the coil reaches the uniform portion of the field, when it will become substantially constant. At that point, the commutator bars to which the coil is connected move into contact with the brushes, and the coil is connected to the external circuit in parallel with other coils in the uniform portion of the field. When the coil passes out from under the pole on the opposite side, its voltage drops as the field strength decreases, and the commutator bars to which it is connected pass out of engagement with the brushes, and the coil is disconnected and open-circuited. As the coil then moves through the neutral zone to the next pole, there is no current flow in it until it passes under the next pole, of opposite polarity, and its commutator bars again make contact with the brushes, although with the connection of the coil to the external circuit reversed.

It will be noted that there is no commutation in this machine in the usual sense, that is, there is no instantaneous reversal of current in the armature coils, and the coils are never short-circuited by the brushes. Thus, there is no commutation current in the usual sense flowing in the brushes, and their load current capacity is not reduced, as in the conventional machine. When an armature coil moves from under a pole, and its circuit is interrupted by the commutator bars to which it is connected moving away from the brushes, a self-induced voltage will, of course, occur in the coil which might cause some sparking, if it is high enough. Usually, however, the brush contact resistance and the brush resistance will be high enough to absorb this voltage and prevent sparking, although, if necessary, the edges of the brushes could be made to have higher resistance than the body of the brush, for this purpose. The pole faces might also be shaped to minimize this effect.

Figure 3:
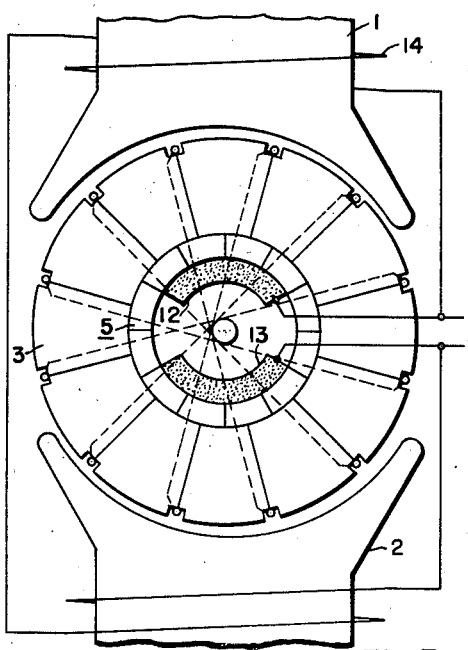
Figs. 3 and 4 are diagrammatic views similar to Fig. 1, showing modifications.
Figure 4:
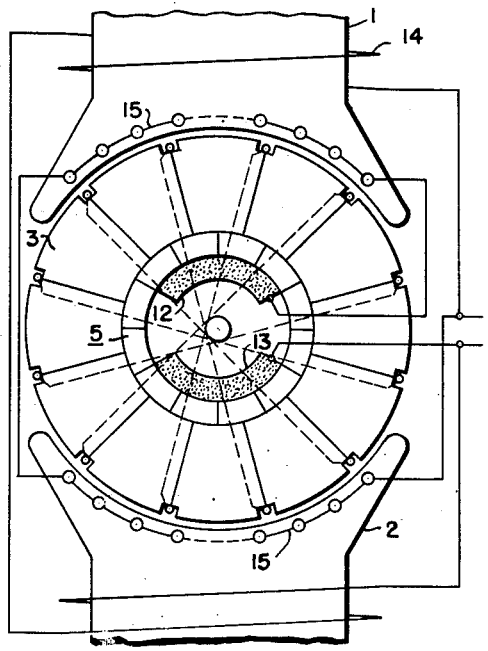

The field form shown in the solid line of Fig. 2, and discussed above, is the no-load field form. When the machine is carrying load, and current is flowing in the armature coils, the field will be distorted by armature reaction, and will have a form generally similar to that shown dotted in Fig. 2. This is undesirable, of course, since the generated voltages in the coils connected in parallel will not be equal, and circulating currents may flow in the body of the brushes, which may result in sparking. To prevent this, the armature reaction can be minimized or compensated for in any desired or usual manner. Thus, in Fig. 3, the poles 1 and 2 are shown as being shaped to form tapered air gaps to compensate for the armature reaction. This method of compensation is effective at one particular load, and tends to minimize the effect at other loads. A more exact compensation may be obtained by the use of a compensating winding 15, as shown in Fig. 4. Such a winding may be of any suitable type and is preferably placed in slots in the pole faces and connected in series with the brushes to carry the load current. The winding 15 is arranged, as indicated, so that the current flows in opposite directions on opposite sides of the pole face, and substantially complete compensation of the armature reaction can be obtained in this manner. If desired, or necessary, an additional series field winding might be placed on the poles to improve the field form.

It should now be apparent that a direct current machine has been provided which is capable of relatively high current output, as compared to a conventional machine of the same size. The new machine has been described as a generator but it will be obvious that it may also be operated as a motor. A two-pole machine has been shown and described, for simplicity, but the invention may be applied to machines having any even number of poles. In a two-pole machine, the coil sides and the commutator bars to which they are connected are diametrically opposite each other, but it will be obvious that when there are more than two poles, the coil sides will be disposed substantially 180 electrical degrees apart and connected to commutator bars which lie 180 electrical degrees apart. A pair of brushes will be provided for each pair of poles, with brushes of like polarity connected together. The coils have been shown diagrammatically as single-turn coils, but if higher voltage is desired, the coils can be wound with several turns to produce a voltage equal to the sum of the voltages generated in each turn.

It will be seen that the new machine has numerous advantages. Although it has a commutator, there is no commutation in the usual sense, and the brush current capacity is not reduced by commutation currents. The armature coils which are passing through the neutral zone do not carry current and are cooled to some extent, during this period, so that their current capacity is increased because of the intermittent current flow. It is also to be noted that, since the coils are individually connected to the commutator and to the external circuit, a failure or open circuit of one coil, or failure of its connection to a commutator bar, does not result in an open circuit of the complete armature winding under a given pole at any instant, and thus no complete failure of the machine results, although there will be some overloading of the remaining coils. This is an important advantage since failure of one coil does not result in loss of the machine. The brushes are of relatively large angular extent and cover a large area of the commutator, so that they can be made relatively short axially of the machine and still have adequate area for high currents. Thus, the commutator can be relatively small as compared to the necessary size of commutator for a conventional direct current machine.

It will now be apparent that a new type of direct current dynamoelectric machine has been provided which has relatively high current capacity, and which has numerous advantages over conventional machines, as described above. A particular embodiment of the invention has been shown and described for the purpose of illustration, but it will be apparent that various modifications and other embodiments are possible, and the invention is not limited to the specific arrangement shown but includes all equivalent embodiments and modifications.

We claim as our invention:

1. A direct current dynamoelectric machine comprising relatively rotatable field and armature members, said field member having pole members thereon providing a magnetic field, said armature member having a plurality of independent coils and a commutator, said commutator having a plurality of parallel, axially extending bars disposed side by side in a cylindrical assembly, each of said coils having its ends individually connected to commutator bars lying substantially 180 electrical degrees apart, and brushes engaging the commutator, each of said brushes being of sufficient angular extent to make simultaneous contact, at any instant, with all the commutator bars which are connected to ends of coils lying under one of said pole members in a substantially uniform portion of the magnetic field.

2. A direct current dynamoelectric machine comprising relatively rotatable field and armature members, said field member having a plurality of pole members thereon providing a magnetic field, said armature member having a slotted core member, a commutator, said commutator having a plurality of parallel, axially extending bars disposed side by side in a cylindrical assembly, a plurality of independent coils disposed in the slots of the core member, each coil having two coil sides lying in slots located substantially 180 electrical degrees apart and being individually connected to two correspondingly located commutator bars, and current collecting means engaging the commutator and adapted to connect in parallel, at any instant, all the coils in which the generated voltage is substantially equal.

3. A direct current dynamoelectric machine comprising relatively rotatable field and armature members, said field member having a plurality of pole members thereon providing a magnetic field, said armature member having a slotted core member, a commutator, said commutator having a plurality of parallel, axially extending bars disposed side by side in a cylindrical assembly, a plurality of independent coils disposed in the slots of the core member, each coil having two coil sides lying in slots located substantially 180 electrical degrees apart and being individually connected to two correspondingly located commutator bars, and current collecting means engaging the commutator and adapted to connect in parallel, at any instant, all the coils which are passing under the pole members in a substantially uniform portion of the magnetic field.

4. A direct current dynamoelectric machine comprising relatively rotatable field and armature members, said field member having a plurality of pole members thereon providing a magnetic field, said armature member having a slotted core member, a commutator, said commutator having a plurality of parallel, axially extending bars disposed side by side in a cylindrical assembly, a plurality of independent coils disposed in the slots of the core member, each coil having two coil sides lying in slots located substantially 180 electrical degrees apart and being individually connected to two commutator bars located 180 electrical degrees apart, and brushes engaging the commutator, each of said brushes being of sufficient angular extent to make simultaneous contact, at any instant, with all the commutator bars connected to coil sides which are passing under one pole member in a substantially uniform portion of the magnetic field.

5. A direct current dynamoelectric machine comprising relatively rotatable field and armature members, said field member having a plurality of pole members thereon providing a magnetic field, said armature member having a slotted core member, a commutator, said commutator having a plurality of parallel, axially extending bars disposed side by side in a cylindrical assembly, a plurality of independent coils disposed in the slots of the core member, each coil having two coil sides lying in slots located substantially 180 electrical degrees apart and being individually connected to two commutator bars located 180 electrical degrees apart, and brushes engaging the commutator, each of said brushes extending over a portion of the commutator substantially equal in angular extent to the angular extent of the uniform portion of the magnetic field under each pole member.

6. A direct current dynamoelectric machine comprising relatively rotatable field and armature members, said field member having a plurality of pole members thereon providing a magnetic field, said armature member having a slotted core member, a commutator, said commutator having a plurality of parallel, axially extending bars disposed side by side in a cylindrical assembly, a plurality of independent coils disposed in the slots of the core member, each coil having two coil sides lying in slots located substantially 180 electrical degrees apart and being individually connected to two commutator bars located 180 electrical degrees apart, and brushes engaging the commutator, each of said brushes extending over a portion of the commutator substantially equal in angular extent to the angular extent of the uniform portion of the magnetic field under each pole member, each brush making simultaneous contact with a plurality of commutator bars to connect in parallel the armature coils in which the generated voltage is substantially equal.

References Cited in the file of this patent

FOREIGN PATENTS 25,013 Germany _____ Jan. 11, 1884

OTHER REFERENCES

"Die Gleichstrom Maschine," by Arnold, vol. 1, Julius Springer, Berlin, 1906, pp. 33–43.